United States Patent Office 3,766,119
Patented Oct. 16, 1973

3,766,119
WATER-SOLUBLE ALKYD RESINS FROM DI(2 - HYDROXYETHOXYACETAMIDO) ALKYLETHANES
Thomas C. Snapp, Jr., Alden E. Blood, and Kenneth H. Albers, Longview, Tex., assignors to Eastman Kodak Company, Rochester, N.Y.
No Drawing. Filed Mar. 22, 1972, Ser. No. 237,124
Int. Cl. C08g 20/30, 41/00
U.S. Cl. 260—29.2 N
17 Claims

ABSTRACT OF THE DISCLOSURE

This invention relates to a curable, water-soluble alkyd resin useful in an improved protective coating composition. The resin is produced through the polycondensation of di(2-hydroxyethoxyacetamido)alkylethanes, aliphatic polyols having at least three hydroxyl groups, and one or more polycarboxylic acids or anhydrides having at least two carboxyl groups. If desirable, a trioletheramide such as N,N - bis(2-hydroxyethyl)-2-hydroxyethoxyacetamide may be used in combination with or in place of the aliphatic polyols.

---

This invention relates to novel alkyd resins that contain the dioldietherdiamide, di(2 - hydroxyethoxyacetamido)alkylethane. More particularly, the invention is concerned with the preparation of curable, water-soluble polyesteretheramides of the aforementioned dioldietherdiamide, aliphatic polyol(s), and a polycarboxylic acid(s) useful in preparation of protective coating compositions.

The term "water-soluble" as used herein means that the alkyd resins are soluble in water in a broad ratio of, for example, from about 1:0.5–6.0. If necessary, from about 1 to about 50 weight percent, and preferably about 25 to about 40 weight percent, of an organic coupler or cosolvent may be added to the water to assist the solubility of the resin. Preferably, this coupler is an alcohol or glycol of from 2 to 15 carbons although other organic or inorganic solvent agents may be used.

Alkyd resins comprising residues of polyhydroxy compounds, such as glycerine, trimethylolpropane, and pentaerythritol and polycarboxylic acids in the polymeric chain have heretofore been utilized to provide surface coating compositions such as paint; see U.S. Pat. No. 3,213,063. Other alkyd resins such as certain polyesteramides are also known from the prior art as exemplified by U.S. Pats. No. 3,447,916; 2,644,773; 2,831,813; 2,944,025; 3,341,573; 3,083,188; French Pat. No. 1,542,811; Canadian Pat. No. 812,738; Belgium Pat. No. 732,008; and Japanese Pat. No. 16911/69. Many of these polyesteramides, however, are oil-soluble materials and are used as additives for petroleum products. Certain of these various types of alkyd resins do not provide satisfactory protective coating compositions unless subjected to a separate hot air drying curing operation. Moreover, many of these alkyd resins when used in protective coating compositions require the use of expensive polycarboxylic acid compounds if the resultant alkyd resin used in the protective coating composition is to be water-soluble. In addition, protective coating compositions prepared from certain of these prior art alkyd resins are less impact-resistant and less hard than is desired in many cases.

None of the prior art alkyd resins, such as those noted above, contain the residue of the dioldietherdiamide, di(2-hydroxyethoxyacetamido)alkylethane. This particular dioldietherdiamide has unexpectedly been found to possess a high degree of water solubility. Therefore, it is an object of the present invention to provide a polyesteretheramide of the aforementioned dioldietherdiamide in the polymeric molecular chain.

Another object of the invention is to provide polyesteretheramides capable of being used as protective coating compositions for metallic and other types of substrates.

A further object of the invention is to provide water-soluble, curable polyesteretheramides capable of being utilized in a protective coating composition which, when coated onto metallic substrates and baked, cure to form protective surface coatings exhibiting improved hardness and impact resistance in addition to other desirable properties such as solvent and weather resistance, flexibility and gloss.

It is a further object of the present invention to provide improved water-soluble protective coating compositions which possess such useful properties.

It is still another object of the present invention to provide new water-soluble, curable polyesteretheramide resins capable of being used in protective coating compositions.

Another object of the present invention is to provide polyesteretheramide resins suitable for use in protective coating compositions which are curable without a separate hot air drying operation prior to baking the protective coating compositions on a substrate.

These and other objects of the present invention will become apparent from the following description.

According to the present invention there is provided a curable, water-soluble polyesteretheramide of (A) a polycarboxylic acid component comprising at least one polycarboxylic acid or anhydride compound having at least two carboxyl groups, 4 to 20 carbon atoms and selected from the group consisting of aliphatic and aromatic acids or their anhydrides, (B) aliphatic polyols having from 3 to 15 carbon atoms and at least three hydroxyl groups, and (C) a dioldietherdiamide having the formula:

(I)
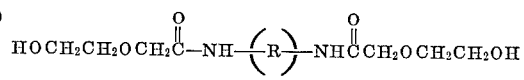

wherein R is a member selected from the group consisting of

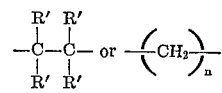

wherein each R' is methyl or ethyl and $n$ is a positive integer between 1 and 6, or combinations thereof, with the proviso that the ratio of total hydroxyl groups in the polyol(s) and dioldietherdiamide components to carboxyl groups in the acid component is within the range of about 1.0 to about 1.6:1, preferably 1.2 to 1.4:1, and that said components through an oxy-carbonyl linkage form integral recurring ester units of the polyesteretheramide molecular chain. If desirable, the polyesteretheramide may comprise, in addition to the dioldietherdiamide compound of Formula I shown hereinabove, a substantial amount (i.e., from about 1 to about 20 wegiht percent of the resin) of a trioletheramide having the formula (II)
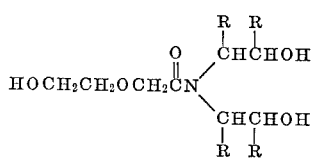

wherein each R is a member selected from the group consisting of hydrogen, methyl or ethyl or combinations thereof. This trioletheramide can serve as the polyol if desirable.

In a further aspect of the present invention there is provided a water-soluble protective coating composition comprising in admixture about 1 to about 70 weight percent, and preferably about 10 to about 50 weight percent, of the above-described polyesteretheramides, a volatile base, and water.

The above-described polyesteretheramides may be prepared by heating together the reactants under conditions which permit the formation of polyesters, suitable conditions being those normally used in the manufacture of alkyd resins. For example, the polyesteretheramide may be prepared by heating the mixture of the above-described polycarboxylic acid component, aliphatic polyol and dioldietherdiamide within a temperature range of from about 110° C. to about 260° C., preferably between about 120° C. to about 170° C., until a polyesteretheramide reaction product having an acid number between about 5 to about 100, and preferably between about 30 to about 75 is obtained. In general, this requires a reaction time of from about 1 to about 12 hours or longer. Preferably, the mixture is heated in the presence of an azeotropic media, e.g., toluene, to remove the water of reaction. The order of addition of the various reactants comprised by the polyesteretheramide reaction products of the instant invention is not critical. All reactants may, for example, be mixed together and heated or the reaction can be carried out in stages at which various reactants may be added. If desirable, a polyester catalyst such as lead ozide, zinc acetate, antimony oxide and the like may be utilized in amounts of about 0.05 to about 5.0 weight percent based on the weight of said reaction mixture excluding the azeotropic media if used. However, it is preferred to carry out this process without a catalyst.

The novel polyesteretheramides of the present invention are of a particular value because they can be converted to a cross-linked, insoluble form, as for example in a baked protective coating composition, without the use of a separate precuring operation, such as air drying, before baking the protective coating composition. Moreover, inasmuch as the water-solubility of the present polyesteretheramide resins is due to the water-solubility of the dioldietherdiamide residue in the polymeric molecular chain, it is unnecessary to use the more expensive polycarboxylic acid compounds presently used in producing conventional water-soluble alkyd resins. That is, conventional water-soluble alkyd resins prepared from such polyhydroxy alcohols as glycerine, dimethanol propionic acid, trimethylolethane, trimethylolpropane and pentaerythritol generally required tri- and tetracarboxylic acids such as trimellitic acid and anhydride, benzophenone tetracarboxylic acid, and pyromellitic anhydride, etc. Accordingly, these alkyd resins are made water-soluble by neutralization of the unreactive carboxyls in the tri- and tetracarboxylic acid components of the resins. Moreover, these conventional water-soluble alkyd resins also utilize the tri- and tetracarboxylic acid to provide cross-linking of the alkyd resin. In contrast, water-solubility of the polyesteretheramide of the present invention is provided by the recurring units of di(2-hydroxyethoxyacetamido) alkylethane residue appearing in the polymeric molecular chain. Hence, less expensive polycarboxylic acid components such as adipic acid and phthalic acids may be utilized, and, in fact, are preferred.

The novel polyesteretheramide resins of the present invention may vary in properties depending upon the particular amount and types of materials comprised by the dioldietherdiamide, polyol component, the polycarboxylic acid component, and, when used, the trioletheramide of Formula II. For example, the water-solubility of the polyesteretheramide may vary depending upon the amount of the dioldietherdiamide and trioletheramide residue contained in the polymeric molecular chain. In addition, other properties of the alkyd resins such as glossiness, hardness, and impact-resistance will vary to some extent depending upon the additional types of polyol compounds utilized. For example, trimethylolpropane and pentaerythritol provide an alkyd resin with excellent gloss, hardness and impact-resistance.

The polycarboxylic acid or acids comprising the polycarboxylic acid component of the instant polyesteretheramide resin may be selected from those acids or anhydrides having from about 4 to about 20 carbon atoms and selected from the group consisting of aliphatic (by aliphatic is meant alkyl and alkenyl) and aromatic acids and anhydrides having at least 2 carboxyl groups. Preferbly, the polycarboxylic acid is a dicarboxylic acid or anhydride having from 4 to about 12 carbon atoms. Examples of these preferred acids and anhydrides include succinic, glutaric, adipic, suberic, sebacic, phthalic, isophthalic, terephthalic, trimellitic, mixtures of the foregoing compounds and the like. Tri- and tetrafunctional carboxylic acid compounds such as tri-mellitic anhydride, benzophenone tetracarboxylic acid, dimethanol propionic acid, etc. may also be used; however, as pointed out above, these tri- and tetrafunctional acids are more expensive and, hence not preferred. Especially suitable polycarboxylic acids are isophthalic and adipic acid and mixtures of the same.

The polyols of polyhydroxy alcohols as they are often called which may be used in the polyol component of the polyesteretheramide of the present invention to complement the dioldietherdiamide described hereinabove, are aliphatic polyols, including cycloaliphatic polyols, containing at least 3 carbon atoms, preferably up to 15 carbon atoms. Alkyl or saturated hydrocarbon alcohols are particularly preferred. Both alkyl and cycloalkyl polyols can be employed and these include glycerol, trimethylolpropane, pentaerythritol, trimethylolethane, dipentaerythritol, and tripentaerythritol. Use of mixtures of any two or more of these polyols is also contemplated by the present invention. As mentioned hereinabove, a trioletheramide such as N,N-bis(2 - hydroxyethyl) - 2 - hydroxyethoxyacetamide can be used as part or all of the required polyol. Advantageously, the amount of aliphatic polyol contained in the polyhydroxy alcohol component of the polyesteretheramide in addition to the dioldietherdiamide described above, varies from about 25 to about 75 weight percent of the total amount of the polyhydroxy alcohol component.

The polyesteretheramide resin prepared as described above can be stripped of solvent, if any is used. Having thus obtained the resin in a viscous liquid form, the protective surface coating composition of the present invention may then be prepared as follows: the polyesteretheramide resin and an aqueous media containing a volatile base such as ammonia or preferably N,N-dimethylethanolamine are mixed together. The polyesteretheramide may be in a liquid form when admixed with the basic aqueous media preferably at a temperature within the range of 60° C. to 80° C. The basic aqueous media dissolves the polyesteretheramide resin and neutralizes free acid groups of the resin. As a result, there is obtained a resin solution with a pH generally from about 6.5 to about 9, although resin solutions with slightly lower pH's may also be obtained. Some of the water in the aqueous media in which the polyesteretheramide is dissolved may be replaced by alcohols such as ethanol, tertiary butanol, ether alcohols, ether alcohol esters, etc. since the polyesteretheramide of the present invention is alcohol-soluble as well as water-soluble. This resin solution provides an excellent surface coating composition for metallic and other substrates. In addition to modifying the aqueous media of the surface coating composition by partial substitution of alcohols as noted above, the surface coating composition may also be modified by the addition of certain pigments, such as $TiO_2$, and the resulting mixtures may be used as an enamel paint for metal substrates. Advantageously, a surface coating composition according to the present invention contains about 1 to 70 weight percent polyesteretheramide.

The polyesteretheramide protective coating composition of the present invention may be coated on a variety of substrates as by brushing, dipping, spraying, stirring or impregnating. The coating composition, when applied on the substrate, is baked at temperatures between 125° C. and 200° C., thereby curing by loss of volatile base and condensation of free carboxyl and hydroxyl groups. The resulting baked coating is glossy, flexible, solvent and weather resistant, and possesses improved impact-resistance and hardness. The coating composition is especially advantageous over known water-soluble coating compositions in that there is no need for any special curing operation such as air drying prior to baking. In addition, the baking temperature noted above, i.e., 125° C. to 200° C., is less than the temperature required to bake conventional alkyd enamels. Moreover, when baked and cured, the surface coating composition of the present invention yields coatings which are harder and more impact-resistant than most other conventional coatings as will be demonstrated hereinafter. Baking time for the coating composition of the invention varies from about 10 minutes to about 40 minutes. Although longer times may be used, some cratering and yellowing of the coating may occur when these longer baking times are used.

The following examples are included to further illustrate the present invention.

EXAMPLE 1

This example demonstrates the typical process used to produce the water-soluble polyesteretheramide of the present invention. A 1-liter, 4-neck, round-bottom flask is fitted with a mechanical stirrer, a thermometer, a nitrogen gas dispersion tube, and a Dean-Stark trap which in turn is fitted on a steam-jacketed condenser beneath a water-cooled condenser. The flask is charged with 100 milliliters toluene, 107.9 grams of isophthalic acid, 51.1 grams of adipic acid, 41.5 grams of trimethylolpropane, and 243.4 grams of the dioldietherdiamide, 1,2-di-(2-hydroxyethoxyacetamido)ethane. The mixture is heated to 140° C. and maintained at this level for about 5 hours. During this time removal of the water of reaction occurs. The resulting product is a highly viscous homogeneous liquid having an acid number of 55. This liquid is the polyesteretheramide of the present invention. Having obtained the polyesteretheramide resin, the resin is then dissolved in a solution of 2-dimethylaminoethanol in aqueous t-butyl alcohol to give an aqueous-alcoholic solution of the polyesteretheramide having a pH of from 7 to about 9. This solution contains 40% by weight of the polyesteretheramide resin. A curing agent of hexamethoxymethylmelamine, although not necessary, is added to the resin solution in an amount of 15 weight percent based on the weight of the polyesteretheramide resin contained in the solution. The polyesteretheramide solution is then pigmented with $TiO_2$ at a pigment to resin ratio of 0.7:1. The resulting mixture is milled for about 16 hours. A film of this resulting mixture is applied at a thickness of about 0.0015 inch to a steel plate and then baked without preliminary drying at about 150° C. for about 30 minutes. The baked enamel coating exhibits good gloss, does not soften when a few drops of acetone are placed on the film, and does not crack when the coated steel plate is given a 180° bend on a ¼-inch conical mandrel. In an impact hardness test, the baked steel plate coating is not damaged by an impact of 90 inch pounds. In addition, the baked coating exhibits a pencil hardness greater than 6H.

EXAMPLE 2

This example demonstrates the polyesteretheramide of the present invention containing pentaerythritol as an additional aliphatic polyhydroxy compound complementing the dioldietherdiamide. The reaction apparatus used in this example is identical to that described above in Example 1. In this example, the flask is charged with 100 milliliters of toluene, 51.1 grams of adipic acid, 107.9 grams of isophthalic acid, 38.1 grams of pentaerythritol and 243.4 grams of the dioldietherdiamide, 1,2-di(2-hydroxyethoxyacetamido)ethane. The mixture is heated to 155° C. over a 10-hour interval. During this time the water of reaction is removed. The resulting polyesteretheramide product is a highly viscous homogeneous liquid having an acid number of 65. This alkyd resin of polyesteretheramide is then dissolved in an aqueous alcoholic solution of ethanol and water. The solution contains 50 percent by weight ethanol. The solution also contains ammonium hydroxide as the volatile base used to neutralize free acid groups contained in the polyesteretheramide resin. The resulting resin solution contains 40 percent by weight polyesteretheramide and has a pH of 7 to 9. Hexamethoxymethylmelamine is added as a curing agent in an amount of 12.5 weight percent based on the weight of the alkyd resin content. A coating composition of enamel which contains a $TiO_2$ pigment is then prepared according to the procedure described above in Example 1. A 0.001-inch film of this enamel coating composition mixture is painted on a steel plate and is baked without preliminary drying at about 160° C. for about 30 minutes. The baked coating has a good gloss, does not soften when a few drops of acetone are placed on the coating, and does not crack when the steel plate test panel is given a 180° bend on a ⅛-inch conical mandrel. The pencil hardness of the coating is greater than 6H, and it is not damaged by an impact of 150 inch pounds.

This example shows that other alcohols in addition to that noted in Example 1 above may be used as a cosolvent for the polyesteretheramide resin which is being processed into a protective surface composition. In addition it shows that other bases in addition to that used in Example 1 above may be used to neutralize the free acid contained in the polyesteretheramide which is dissolved in the aqueous-alcoholic media.

EXAMPLE 3

This example demonstrates that phthalic anhydride and trimethylolpropane can be utilized to produce a satisfactory resin in accordance with the present invention. It also shows that film can be produced without the addition of an external cross-linking agent such as hexamethoxymethylmelamine used in Examples 1 and 2. In this example the reaction apparatus and procedure used to prepare the polyesteretheramide resin is identical to that described above in Example 1. Here, 100 milliliters of toluene, 96.2 grams of phthalic anhydride, 224.3 grams of the dioldietherdiamide 1,2-di(2-hydroxyethoxyacetamido)ethane, 51.5 grams of adipic acid, and 37.5 grams of trimethylolpropane are charged to the reaction flask. The flask is heated to a temperature of 160° C. for a time of about 10 hours with the resultant polyesteretheramide resin product having an acid number of 45. A coating composition prepared from this polyesteretheramide in a manner identical to that described in Example 1 above passes the acetone test described in Example 1.

EXAMPLE 4

This example demonstrates that maleic anhydride, adipic acid, dioldietherdiamide, and trimethylolpropane without an aromatic dicarboxylic acid can be utilized to produce a satisfactory polyesteretheramide resin in accordance with the present invention. It also demonstrates that a large excess of hydroxyl groups (approximately 45 percent excess) in comparison to carboxyl groups may be used. In this example a polyesteretheramide resin is again prepared as described by the procedure set out in Example 1 above. 75 milliliters of toluene 293.0 grams of the dioldietherdiamide, 1,2-di(2-hydroxyethoxyacetamido)ethane, 9.8 grams of maleic anhydride, 131.4 grams of adipic acid, and 29.5 grams of trimethylolpropane are charged to the reaction flask. The flask is heated to a temperature of about 170° C. for a time of about 12 hours until the acid number of the resultant polyesteretheramide resin obtained therefrom is 45. The resultant polyesteretheramide resin is diluted with water to form a 20 percent resin in water solution. The solution is applied as a film of 0.001-inch thick on steel and aluminum plates and without prelminary drying is baked at about 150° C. for about 30 minutes. These baked films pass the acetone test described in Example 1 and have excellent gloss.

EXAMPLE 5

This example demonstrates that glycerol can be utilized to produce the satisfactory polyesteretheramide resin according to the present invention. This resin is prepared by the procedure and in the reaction apparatus described in Example 1. In this example, 100 milliliters of toluene, 107.9 grams of isophthalic acid, 51.1 grams of adipic acid, 28.5 grams of glycerol and 243.4 grams of the dioldietherdiamide, 1,2 - di(2 - hydroxyethoxyacetamido)ethane are charged to the reaction flask. The flask is heated to a temperature of about 150° C. until the resultant polyesteretheramide resin obtained has an acid number of 50. The resultant polyesteretheramide resin is a highly viscous liquid having a light yellow color. An enamel surface coating composition is prepared from this polyesteretheramide resin using the procedure described in Example 1 hereinabove. A film of this enamel is applied to a steel plate and without preliminary drying is baked at about 350° C. for about 30 minutes. The baked film passes the acetone test described in Example 1.

EXAMPLE 6

This example demonstrates that pentaerythritol, diglycolic acid and adipic acid without an aromatic dicarboxylic acid can be utilized to produce a satisfactory polyesteretheramide resin according to the present invention. It also shows that a large excess of hydroxyl groups in comparison to carboxyl groups can be used to afford the desired polyesteretheramide resin. This resin is prepared according to the procedure and in the reaction apparatus described in Example 1 above. In this example 100 milliliters of toluene, 87.1 grams of diglycolic acid, 243.4 grams of dioldietherdiamide 1,2-di(2-hydroxyethoxyacetamido)ethane, 38.1 grams of pentaerythritol and 51.1 grams of adipic acid are charged to the reaction flask. The flask is heated to about 150° C. for a time sufficient to give a resin having an acid number of 48. The resultant polyesteretheramide resin obtained is then converted into a protective coating composition enamel by the procedure described in Example 1 hereinabove. A thin 0.0015-inch film of this enamel is applied on a steel plate and without preliminary drying is baked at about 300° F. for about 30 minutes. The baked film exhibits good gloss, passes the acetone test described in Example 1.

EXAMPLE 7

This example demonstrates at the conditions specified that the substitution of neopentyl glycol for the dioldietherdiamide used in the present invention produces a water-insoluble resin rather than a water-soluble resin. The resin in this example is prepared by the procedure and in the reaction apparatus described in Example 1 hereinabove. In this case 100 milliliters of toluene, 26.0 grams of glycerol, 88.0 grams of neopentyl glycol, 108.0 grams of isophthalic acid, and 51.1 grams of adipic acid is charged to the reaction flask. The flask is then heated to a temperature varying from 125° C. to 180° C. over a period of 28 hours. The resulting alkyd resin product has an acid number of 97. The alkyd resin product and ammonium hydroxide are added to 400 milliliters of a water-ethanol solution containing 50 weight percent of water until a pH of 8–10 is reached. The alkyd resin remains insoluble and forms a sludge in the aqueous ethanol solution.

The following examples relate to alkyd resins prepared with 1,2-di(2 - hydroxyethoxyacetamido)alkylethane and N,N-bis(2-hydroxyalkyl)-2-hydroxyethoxyacetamide.

EXAMPLE 8

This example demonstrates that a dioldietherdiamide and trioletheramide, which serves as the polyol, can be reacted with a mixture of polycarboxylic acids to produce a satisfactory polyesteretheramide resin according to the present invention. The resin in this example is prepared according to the procedure and in the reaction apparatus described in Example 1. A mixture of 50 milliliters of toluene, 65.7 grams of adipic acid, 74.7 grams of isophthalic acid, 103.5 grams of N,N-bis(2-hydroxyethyl)-2-hydroxyethoxyacetamide, and 79.2 grams of 1,2-di(2-hydroxyethoxyacetamido)ethane is reacted at 130–140° C. The reaction is continued until a resin having an acid number of 65 is obtained. The resultant polyesteretheramide resin is a highly viscous liquid which is readily formulated into a water-soluble paint by known techniques such as those described in Example 1.

EXAMPLE 9

This example demonstrates that a trioletheramide can be the minor polyetheramide component in the preparation of a water-soluble polyesteretheramide resin with a mixture of polycarboxylic acids. The resin in this example is prepared according to the procedure and in the reaction apparatus described in Example 1. The flask is charged with 100 milliliters of toluene, 51.8 grams of N,N-bis(2-hydroxyethyl)-2-hydroxyethoxyacetamide, 33.2 grams of isophthalic acid, 87.6 grams of adipic acid, and 158.4 grams of dioldietherdiamide, 1,2-di(2-hydroxyethoxyacetamido)ethane. The mixture is heated at 120–130° C. with removal of water of reaction until a resin having an acid number of 55 is obtained. This resin can be formulated into a water-soluble paint by known techniques such as described in Example 1.

EXAMPLE 10

The reaction apparatus used in this example is identical to that described above in Example 1. The flask is charged with 100 milliliters toluene, 107.9 grams of isophthalic acid, 51.1 grams of adipic acid, 41.5 grams of trimethylolpropane, and 256.3 grams of the dioldietherdiamide, 1,3-di(2-hydroxyethoxyacetamido)-propane. The mixture is heated to 140° C. and maintained at this level for about 5 hours. During this time removal of the water of reaction occurs. The resulting product is a highly viscous homogeneous liquid having an acid number of 55.

EXAMPLE 11

This example demonstrates the use of 1,6-di(2-hydroxyethoxyacetamido)hexane in the production of a satisfactory resin in accordance with the present invention. It also shows that film can be produced without the addition of an external cross-linking agent such as hexamethoxymethylmelamine used in Examples 1 and 2. In this example the reaction apparatus and procedure used to prepare the polyesteretheramide resin is identical to that described above in Example 1. Here, 100 milliliters of toluene, 96.2 grams of phthalic anhydride, 272.2 grams of the dioldietherdiamide 1,6 - di(2 - hydroxyethoxyacetamido)hexane, 51.5 grams of adipic acid, and 37.5 grams of trimethylolpropane are charged to the reaction flask. The flask is heated to a temperature of 160° C. for a time of about 10 hours with the resultant polyesteretheramide resin product having an acid number of 49. A coating composition prepared from this polyesteretheramide in a manner identical to that described in Example 1 above passes the acetone test described in Example 1.

The invention has been described in detail with particular reference to preferred embodiments thereof, but it will be understood that variations and modifications can be effected within the spirit and scope of the invention as described hereinabove.

We claim:

1. A curable, water-soluble polyesteretheramide, having an acid number between about 5 to about 100, of (A) a polycarboxylic acid component containing at least one polycarboxylic acid compound having 4 to 20 carbon atoms and selected from the group consisting of aliphatic and aromatic acids or anhydrides, and mixtures thereof, (B) a polyol component selected from the group consisting of (1) aliphatic polyols having 3 to 15 carbon atoms and at least three hydroxyl groups, and (2) trioletheramides having the formula

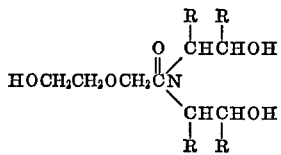

wherein each R is a member selected from the group consisting of hydrogen, methyl and ethyl, or mixtures of the aliphatic polyols and trioletheramides, and (C) a dioldietherdiamide having the formula:

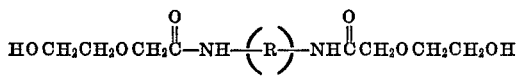

wherein R is a member selected from the group consisting of

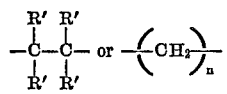

wherein each R' is methyl or ethyl and $n$ is a positive integer between 1 and 6, or combinations thereof, the ratio of the hydroxy groups in said polyol component to carboxyl groups in said acid component being within the range of 1.0:1 to 1.6:1, the aliphatic polyol is about 25 to about 75 weight percent of the total amount of polyhydroxy alcohol components B and C, and the trioletheramide component is 0 to about 20 weight percent of the polyesteretheramide; said components through an oxycarbonyl linkage forming integral recurring ester units of the polyesteretheramide molecular chain.

2. A polyesteretheramide according to claim 1 wherein said aliphatic polyols having 3 to 15 carbon atoms are selected from the group consisting of glycerol, trimethylolpropane, pentaerythritol, trimethylolethane, dipentaerythtritol and tripentaerythritol.

3. A polyesteretheramide according to claim 1 wherein the dioldietherdiamide is selected from the group consisting of 1,1-di(2-hydroxyethoxyacetamido)methane; 1,2-di(2 - hydroxyethoxyacetamido)ethane; 1,3-di(2 - hydroxyethoxyacetamido)propane; 1,4 - di(2 - hydroxyethoxyacetamido)butane; 1,5 - di(2 - hydroxyethoxyacetamido)pentane; or 1,6-di(2-hydroxyethoxyacetamido)hexane.

4. A polyesteretheramide according to claim 1 wherein the polyol component is N,N-bis(2-hydroxyethyl)2-hydroxyethoxyacetamide.

5. A polyesteretheramide according to claim 1 wherein said polycarboxylic acid compound comprising the polycarboxylic acid component is selected from aliphatic and aromatic acids having 4 to 12 carbon atoms.

6. A polyesteretheramide according to claim 5 wherein said polycarboxylic acid compound comprises dicarboxylic acids selected from the group consisting of diglycolic acid, maleic acid, succinic acid, glutaric acid, adipic acid, suberic acid, sebacic acid, phthalic acid, isophthalic acid, terephthalic acid, and trimellitic acid.

7. A polyesteretheramide according to claim 6 wherein said polycarboxylic acid compound is selected from the group consisting of isophthalic acid, adipic acid, diglycolic acid, mixtures of isophthalic acid and adipic acid, and mixtures of diglycolic acid and adipic acid.

8. A polyesteretheramide according to claim 2 wherein said polycarboxylic acid compound comprising the polycarboxylic acid component is selected from aliphatic and aromatic acids having 4 to 12 carbon atoms.

9. A polyesteretheramide according to claim 2 wherein said polycarboxylic acid compound comprising the polycarboxylic acid component comprises anhydrides of diglycolic acid, maleic acid, succinic acid, glutaric acid and phthalic acid.

10. A polyesteretheramide according to claim 2 wherein said polycarboxylic acid compound comprising the polycarboxylic acid component is phthalic anhydride.

11. A polyesteretheramide according to claim 2 wherein said polycarboxylic acid compound comprising the polycarboxylic acid component is a mixture of phthalic anhydride and dipic acid.

12. A polyesteretheramide according to claim 1 wherein the ratio of the hydroxy groups in said alcohol component to carboxyl groups in said acid component is between about 1.2:1 to 1.4:1.

13. A polyesteretheramide according to claim 1 wherein the acid number of the polyesteretheramide product is within the range of from about 30 to about 75.

14. A polyesteretheramide according to claim 1 wherein the dioldietherdiamide is 1,2-di(2-hydroxyethoxyacetamido)ethane.

15. A polyesteretheramide according to claim 1 wherein the dioldietherdiamide is 1,6-di(2-hydroxyethoxyacetamido)hexane.

16. A polyesteretheramide surface coating composition comprising in admixture about 1 to about 70 weight percent of a polyesteretheramide according to claim 1, water and a volatile base.

17. A surface coating composition according to claim 16 which includes a pigment.

No references cited.

MELVIN GOLDSTEIN, Primary Examiner

U.S. Cl. X.R.

117—132 B; 260—75 N

UNITED STATES PATENT OFFICE
CERTIFICATE OF CORRECTION

Patent No. 3,766,119  Dated October 16, 1973

Inventor(s) Thomas C. Snapp, Jr., Alden E. Blood and Kenneth H. Albers

It is certified that error appears in the above-identified patent and that said Letters Patent are hereby corrected as shown below:

Column 7, line 24, "C." should be ---F.---. Column 10, line 29, "dipic" should be ---adipic---.

Signed and sealed this 23rd day of April 1974.

(SEAL)
Attest:

EDWARD M.FLETCHER,JR.
Attesting Officer

C. MARSHALL DANN
Commissioner of Patents